(12) United States Patent
Hirose et al.

(10) Patent No.: US 11,773,565 B1
(45) Date of Patent: Oct. 3, 2023

(54) FUEL TANK OF WORKING VEHICLE

(71) Applicant: TAKEUCHI MFG. CO., LTD., Nagano (JP)

(72) Inventors: Kazuya Hirose, Nagano (JP); Satoshi Miyabara, Nagano (JP); Shingo Takeuchi, Nagano (JP)

(73) Assignee: TAKEUCHI MFG. CO., LTD., Nagano (JP)

( * ) Notice: Subject to any disclaimer, the term of this patent is extended or adjusted under 35 U.S.C. 154(b) by 0 days.

(21) Appl. No.: 17/864,063

(22) Filed: Jul. 13, 2022

(30) Foreign Application Priority Data

Mar. 29, 2022 (JP) .................................. 2022-054257

(51) Int. Cl.
E02F 9/08 (2006.01)
B60K 15/077 (2006.01)

(52) U.S. Cl.
CPC .......... *E02F 9/0883* (2013.01); *B60K 15/077* (2013.01); *B60Y 2200/41* (2013.01)

(58) Field of Classification Search
CPC .. E02F 9/0883; B60K 15/077; B60Y 2200/41
USPC ....................................................... 220/563
See application file for complete search history.

(56) References Cited

FOREIGN PATENT DOCUMENTS

| GB | 2493958 A | * | 2/2013 | ........... B60K 15/035 |
| JP | H08113044 A | * | 5/1996 | ..... B60K 2015/0637 |
| JP | 2009-006814 | | 1/2009 | |
| JP | 2011020643 A | * | 2/2011 | |
| JP | 2017110420 A | * | 6/2017 | |

OTHER PUBLICATIONS

JPH08113044A (Akihiko et al.) (May 7, 1996) (Machine Translation) (Year: 1996).*

* cited by examiner

*Primary Examiner* — Mahmoud Gimie
(74) *Attorney, Agent, or Firm* — Stephen J. Weyer, Esq; Stites & Harbison, PLLC

(57) ABSTRACT

A fuel tank includes an upper surface portion, a bottom surface portion, and a peripheral wall portion, and a weir portion vertically arranged at the bottom surface portion and causing a fuel in a predetermined amount to stay in a predetermined position of an inner portion when a vehicle body is inclined. The peripheral wall portion includes a first wall and a second wall which is perpendicular to and continuous with one end side of the first wall. The weir portion includes a first weir, a second weir, a third weir parallel to the first weir, a fourth weir parallel to the first weir and arranged between the first weir and the third weir, and a fifth weir interconnecting the third weir and the fourth weir.

4 Claims, 4 Drawing Sheets

FUEL TANK OF WORKING VEHICLE

CROSS-REFERENCE TO RELATED APPLICATION

This application is based upon and claims the benefit of priority of the prior Japanese Patent Application No. P2022-054257, filed on Mar. 29, 2022, and the entire contents of which are incorporated herein by reference.

TECHNICAL FIELD

The present invention relates to a fuel tank and, more particularly, to a fuel tank which is mounted in a working vehicle and in which a fuel is reserved.

BACKGROUND ART

Heretofore, as examples of working vehicles, there have been known, for example, a loader, an excavator, and a carrier dumper each of which includes a travel unit equipped with crawlers tracks or tires, a vehicle body provided on the travel unit, and a work unit provided at the vehicle body and configured to be hydraulically operated.

Each of the above-mentioned working vehicles has mounted thereon a hydraulic pump which produces hydraulic pressure, and a drive source which drives the hydraulic pump. For example, a configuration that an engine (for example, a diesel engine) is used as the drive source is in widespread use, and a fuel tank in which a fuel for the engine is reserved is mounted at a predetermined position of the vehicle body.

SUMMARY OF INVENTION

Technical Problem

Here, in a working vehicle exemplified by, for example, a loader, an issue that a fuel suction portion becomes exposed due to the occurrence of a deviation of a fuel inside a fuel tank and, thus, what is called air entrainment occurs so that fuel supply is inadvertently stopped, may arise at the time of inclined work (at the time of work in a state in which the vehicle body is inclined) or at the time of occurrence of large swinging of the vehicle body. To address this issue, in a conventional fuel tank of the working vehicle illustrated by example in PTL 1 (JP-A-2009-006814), a configuration that a weir portion for causing a fuel to stay, for example, at the time of inclined work is provided inside the fuel tank and which is capable of causing the fuel to stay inside the weir portion when the vehicle body is inclined toward the front or toward the rear, thus preventing the supply of the fuel from being stopped due to air entrainment, is implemented.

However, particularly in the case of a working vehicle, since, by its nature, inclined work with respect to all directions (360°) may occur, it is important to be able to prevent the fuel suction portion from becoming exposed in whatever direction the vehicle body is inclined. If it is tried to implement a weir portion compatible with all directions (360°) by using a configuration illustrated by example in PTL 1, an issue that the structure of the inside of the fuel tank becomes extremely complex may arise.

On the other hand, since a fuel tank is often formed in a flattened shape, there is an issue that the rigidity of a portion large in area (particularly, a bottom surface portion) becomes low (weak) and deformation is likely to occur therein. To address this issue, in the case of a conventional fuel tank, a solution to this issue is achieved by a configuration that a large number of portions subjected to drawing (raised portions provided in an inward protruding manner) are formed particularly at the bottom surface portion to increase (strengthen) the rigidity and prevent deformation.

However, in the case of such a configuration, an issue that the volume of an internal fuel reservation space (i.e., a tank capacity) becomes decreased and the maximum reservation amount of fuel becomes small may occur.

Solution to Problem

In response to the above issues, one or more aspects of the present invention are directed to providing a fuel tank of a working vehicle, the fuel tank having a configuration including a weir portion and being capable of, while achieving a reduction in the arrangement region (volume region) of the weir portion, in whatever direction out of all directions (360°) the vehicle body is inclined when a remaining fuel is small, causing a predetermined amount of fuel to stay in an inner region of the weir portion to prevent the supply of the fuel from being stopped due to air entrainment and capable of increasing the rigidity of the fuel tank and preventing deformation thereof.

The present invention solves the above-mentioned issues by solution means such as that described in the following.

According to an aspect of the present invention, a fuel tank which is mounted at a vehicle body of a working vehicle and in an inner portion of which a fuel is reserved, includes an upper surface portion, a bottom surface portion, and a peripheral wall portion, and a weir portion vertically arranged at the bottom surface portion and causing the fuel in a predetermined amount to stay in a predetermined position of the inner portion when the vehicle body is inclined, wherein the peripheral wall portion includes a first wall and a second wall which is perpendicular to and continuous with one end side of the first wall, and wherein the weir portion includes a first weir as which the first wall is also used, a second weir as which the second wall is also used, a third weir parallel to the first weir and relatively long, a fourth weir parallel to the first weir, arranged between the first weir and the third weir, and relatively short, and a fifth weir interconnecting the third weir and the fourth weir.

Moreover, the third weir, the fourth weir, and the fifth weir included in the weir portion are formed continuous in a shape of letter J in plan view or a shape of left-right reversal of letter J in plan view.

Moreover, the fuel tank further includes a fixing band insertion hole formed at a region between the second wall and a fore-end portion of the fourth weir and penetrating through the upper surface portion and the bottom surface portion in such a way as to communicate with an exterior of the fuel tank and not to communicate with an interior of the fuel tank.

Moreover, the bottom surface portion includes a fuel suction portion at an inner region surrounded by the third weir, the fourth weir, and the fifth weir and includes a drain portion at an outer region other than the inner region, and a flow path opened toward the drain portion and causing the fuel staying inside the weir portion when the vehicle body is inclined to flow toward the drain portion when the vehicle body has become uninclined is provided between the fixing band insertion hole and the fore-end portion of the fourth weir.

Advantageous Effects of Invention

According to one or more aspects of the present invention, it is possible to, while achieving a reduction in the arrangement region (volume region) of the weir portion, in whatever direction out of all directions (360°) the vehicle body is inclined when a remaining fuel is small, cause a predetermined amount of fuel to stay in an inner region of the weir portion. Accordingly, it is possible to concurrently implement a configuration capable of increasing the volume of a fuel reservation space and a configuration that the supply of the fuel is prevented from being stopped due to air entrainment in whatever direction the vehicle body is inclined when a remaining fuel is small. In addition to this, it is possible to increase the rigidity of the fuel tank while achieving a reduction in portions subjected to drawing provided at the bottom surface portion.

DESCRIPTION OF EMBODIMENTS

Figure 1:
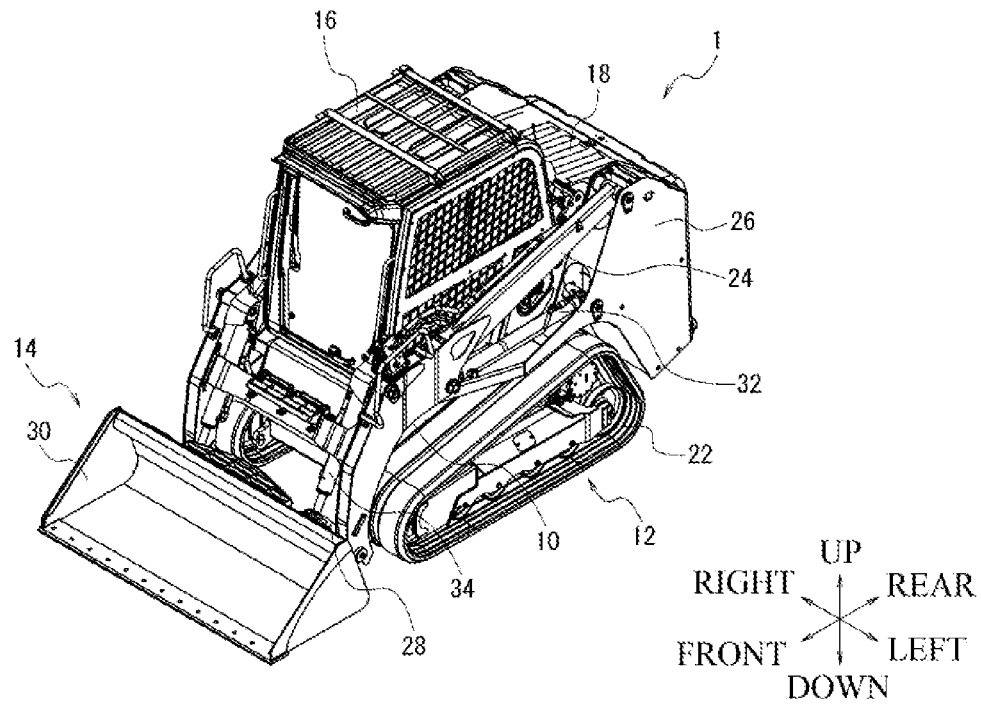
FIG. 1 is a perspective view illustrating an example of a working vehicle at which a fuel tank according to an embodiment of the present invention is mounted.
Figure 2:
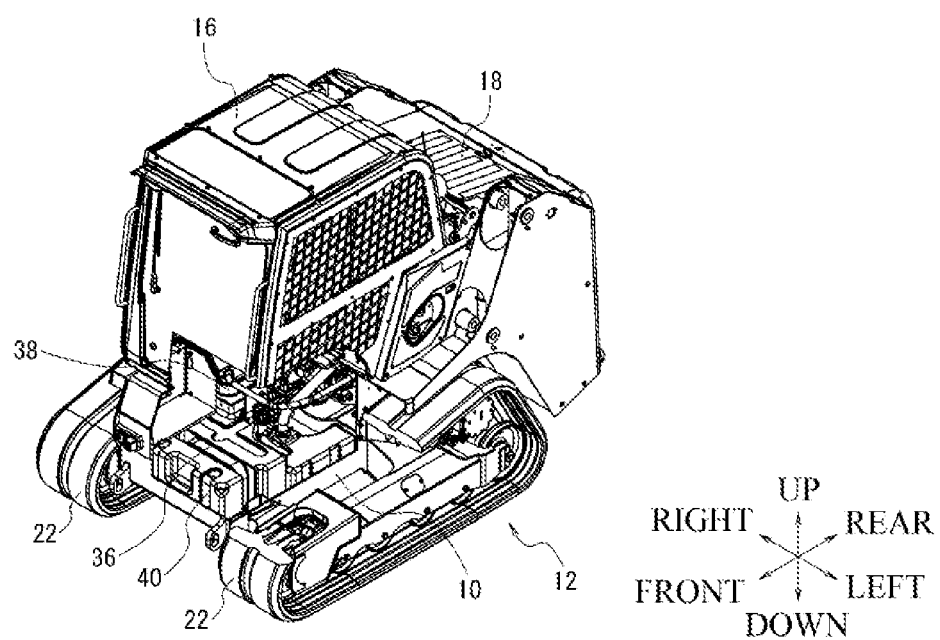
FIG. 2 is a perspective view (partial sectional view) used to explain a mounting position for the fuel tank in the working vehicle illustrated in FIG. 1.

Embodiments of the present invention are described below in detail with reference to the drawings. FIG. 1 is a schematic view (a perspective view as viewed from above a left front portion) illustrating an example of a working vehicle 1 at which a fuel tank 40 according to the present embodiment is mounted, and FIG. 2 is a perspective view with a part thereof shown in cross-section used to explain a mounting position for the fuel tank 40. Furthermore, for the purpose of illustration, up and down, left and right, and front and rear directions may be represented by arrows in the figures. Moreover, in all of the figures for use in describing the embodiment, members having the same functions are assigned the respective same reference characters, and the repetitive description thereof may be omitted.

First, an overall configuration of the working vehicle 1 is described. While, here, a loader which travels with crawlers (called a "crawler loader") is described as an example, the present embodiment is not limited to this.

As illustrated in FIG. 1, the working vehicle 1 is configured to include, with respect to a vehicle body 10 thereof, a travel unit 12 at a lower portion thereof, a work unit 14 at a front portion thereof, a cabin 16 at a central portion thereof, an engine compartment 18 in which, for example, an engine is contained, at a rear portion thereof, and arm posts 26, to which arms 24 for causing the work unit 14 to operate are attached, at the rear portion thereof. Furthermore, the travel unit 12 is configured to include, for example, a pair of left and right crawlers (tracks) 22. However, the present embodiment is not limited to this, and the travel unit 12 can be configured to travel with a pair of left and right tires (called a "skid-steer loader") (not illustrated).

First, the work unit 14 is configured to include a pair of left and right arms 24 which is pivotally connected to the arm posts 26 in such a way as to be swingable up and down, a bracket 28 which is pivotally connected to fore-end portions of the arms 24 in such a way as to be swingable up and down, and an attachment 30 (in the present embodiment, a bucket) which is attached to the bracket 28 in a detachable manner. Here, a pair of left and right arm cylinders 32 is provided in such a way as to span the arm posts 26 and the arms 24, and a pair of left and right cylinders for attachment (commonly known as a "bucket cylinder") 34 is provided in such a way as to span the bracket 28 and the arms 24.

According to this configuration, causing the arm cylinders 32 to extend and contract enables causing the arms 24 to swing up and down with respect to the vehicle body 10. Moreover, causing the cylinders for attachment 34 to extend and contract enables causing the bracket 28, i.e., the attachment 30 mounted thereon, to swing up and down with respect to the arms 24.

In the present embodiment, a configuration that a bucket is provided as the attachment 30 is described as an example. However, the present embodiment is not limited to this configuration, and the attachment 30 is selected and mounted as appropriate in conformity with a work use. As another example of the attachment 30, a hydraulically driven attachment such as a concrete cutter or a trencher can be mounted (not illustrated). The attachment 30 is configured to be replaceable alone or together with the bracket 28. Alternatively, there is a configuration that a bracket and a bucket are integrated with each other (not illustrated). Furthermore, the working vehicle 1 is provided with an oil passage for supplying hydraulic oil to a hydraulically driven attachment (not illustrated).

Furthermore, the other mechanisms (for example, a drive mechanism and a control mechanism) for travel and work in the working vehicle 1 according to the present embodiment are similar to those in a known working vehicle (here, a track loader) and, therefore, the detailed description thereof is omitted.

Next, the engine compartment 18 is provided at the rear portion of the vehicle body 10 (at a position behind the cabin 16), and is equipped with, in the form of being contained therein, for example, an engine (not illustrated) serving as a drive source and peripheral equipment therefor. For example, a diesel engine is used as the engine, but the present embodiment is not limited to this. The above-mentioned travel unit 12 and work unit 14 are configured to be driven by receiving pressure oil supplied from each hydraulic pump driven by the engine. Furthermore, a configuration that a battery is used together with the engine as the drive source can be employed (not illustrated).

Figure 3:
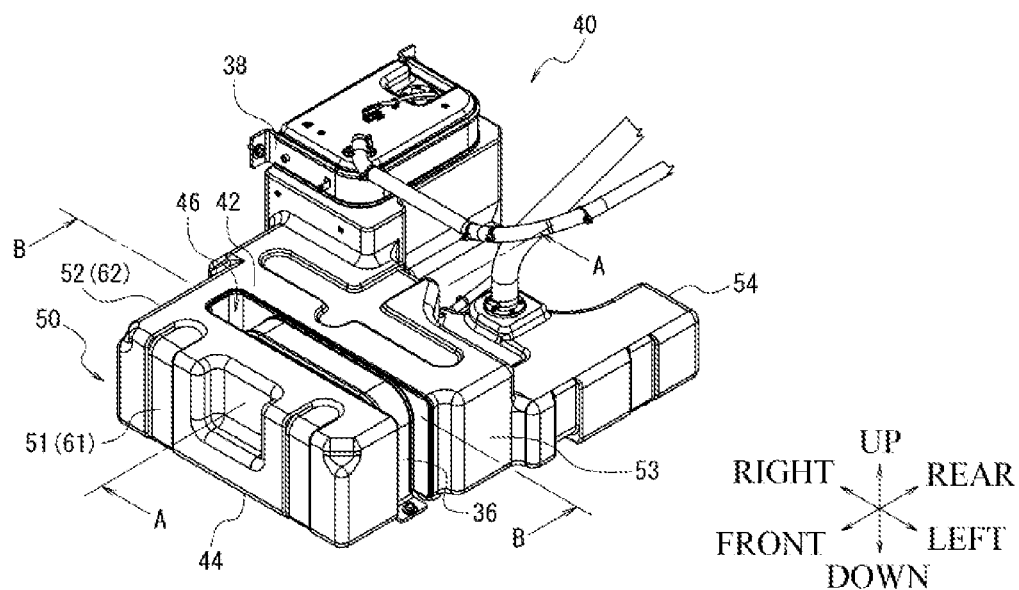
FIG. 3 is a perspective view illustrating an example of a fuel tank according to an embodiment of the present invention.
Figure 4:
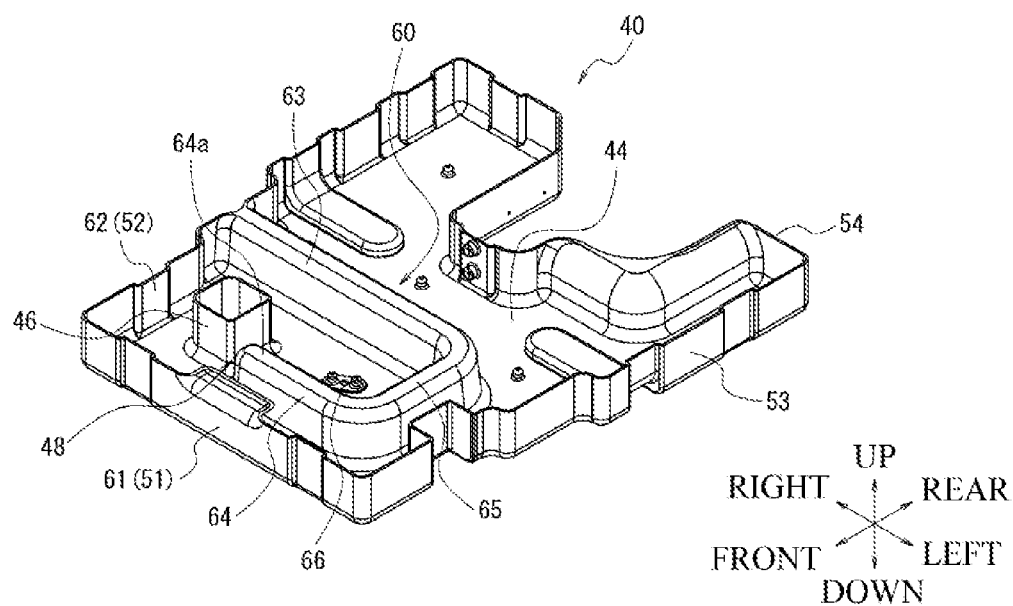
FIG. 4 is perspective sectional view illustrating an internal configuration of the fuel tank illustrated in FIG. 3.
Figure 5:
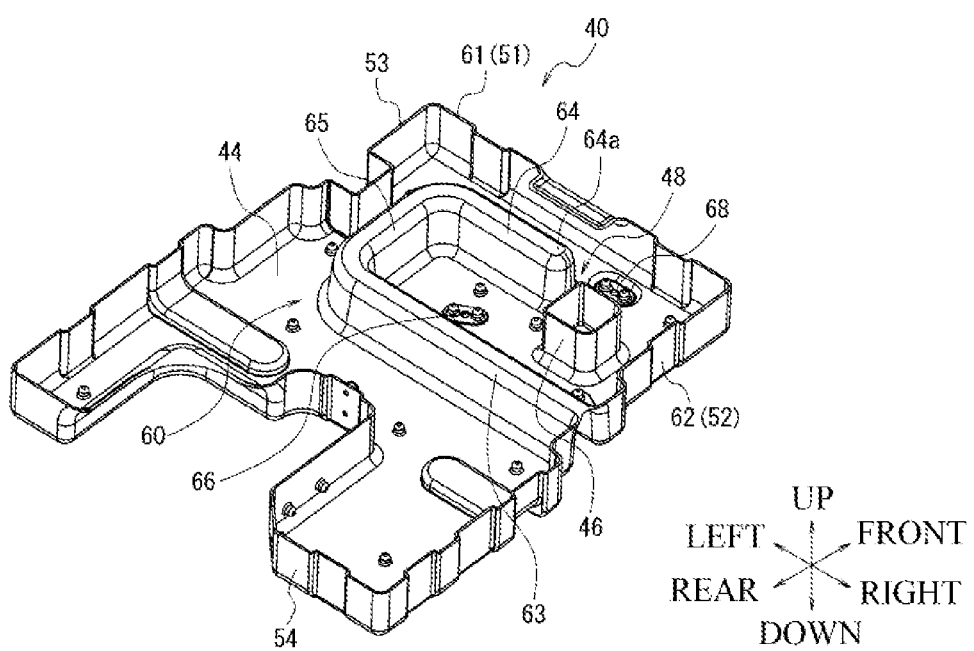
FIG. 5 is perspective sectional view illustrating the internal configuration of the fuel tank illustrated in FIG. 3.

On the other hand, as illustrated in FIG. 2, the fuel tank 40, in which a fuel (for example, light oil) to be supplied to the engine is reserved, is mounted at the front portion of the vehicle body 10 (at a position below the cabin 16). Here, as an example of the fuel tank 40 according to the present embodiment, a perspective view of the appearance thereof, a perspective view of the inside thereof (a diagram as viewed from the front), and a perspective view of the inside thereof (a diagram as viewed from the rear) are illustrated in FIG. 3, FIG. 4, and FIG. 5, respectively. For example, while the fuel tank 40 is configured to be formed from a resin material (for example, polyethylene), the present embodiment is not limited to this and the fuel tank 40 can be configured to be formed from, for example, a metallic material.

The fuel tank 40 is formed in the form of a hollow box including an upper surface portion 42, a bottom surface portion 44, and a peripheral wall portion 50 surrounding a space between the upper surface portion 42 and the bottom surface portion 44. For example, the peripheral wall portion 50 includes a first wall 51 which is arranged at the front side, a second wall 52 which has a configuration perpendicular to and continuous with one end side (in this example, the right end) of the first wall 51 and is arranged at the right side, a third wall 53 which has a configuration perpendicular to and continuous with the other end side (in this example, the left end) of the first wall 51 and is arranged at the left side, and a fourth wall 54 which has a configuration continuous with the rear end of the second wall 52 and the rear end of the third wall 53 and is arranged at the rear side. Furthermore, the arrangement configuration regarding front, rear, left, and right can be reversed as appropriate. Moreover, while, for convenience of designing, the fourth wall 54 is provided with a recess for preventing interference to other equipment mounted in the working vehicle 1, this configuration is not essential but can be omitted or altered as appropriate.

Moreover, the fuel tank 40 includes a weir portion 60 which is vertically arranged on the bottom surface portion 44 (the inner side) and is configured to cause a fuel in a predetermined amount to stay in a predetermined position (an inner region thereof) at the time of inclined work (i.e., when the vehicle body 10 is inclined). For example, as illustrated in FIG. 4 and FIG. 5, the weir portion 60 includes a first weir 61 to a fifth weir 65. Specifically, the first weir 61 has a configuration as which the first wall 51 is also used. Moreover, the second weir 62 has a configuration as which the second wall 52 is also used. Moreover, the third weir 63 has a configuration parallel to the first weir 61 (i.e., the first wall 51) and formed relatively long and is arranged between the first wall 51 and the fourth wall 54 (in this example, on a side closer to the first wall 51 than the middle therebetween). Moreover, the fourth weir 64 has a configuration parallel to the first weir 61 (i.e., the first wall 51) and formed relatively short and is arranged between the first weir 61 and the third weir 63. Moreover, the fifth weir 65 has a configuration continuous with one end side (in this example, the left end) of the third weir 63 and one end side (in this example, the left end) of the fourth weir 64. Additionally, at the bottom surface portion 44, the fuel tank 40 includes a fuel suction portion 66 in an inner region surrounded by the third weir 63, the fourth weir 64, and the fifth weir 65, and also includes a drain portion 68 in an outer region other than the inner region. Furthermore, a fuel tubing (not illustrated) which communicates with a fuel pump (not illustrated) is connected to the fuel suction portion 66. On the other hand, a plug (not illustrated) is screwed to the drain portion 68, and detaching the plug enables discharging a fuel or grounds to the outside.

According to this configuration, studying out a configuration that the first wall 51 and the second wall 52 are directly used as parts of the weir portion 60 enables achieving a reduction in the arrangement region (volume region) of the weir portion 60. Moreover, implementing such a simple configuration enables, in whatever direction out of all directions (360°) the vehicle body 10 is inclined when a remaining fuel is small (in an amount smaller than or equal to a predetermined amount), causing a fuel in a predetermined amount to stay at a predetermined position (specifically, in an inner region of the weir portion 60 including the position of the fuel suction portion 66).

Figure 6A:
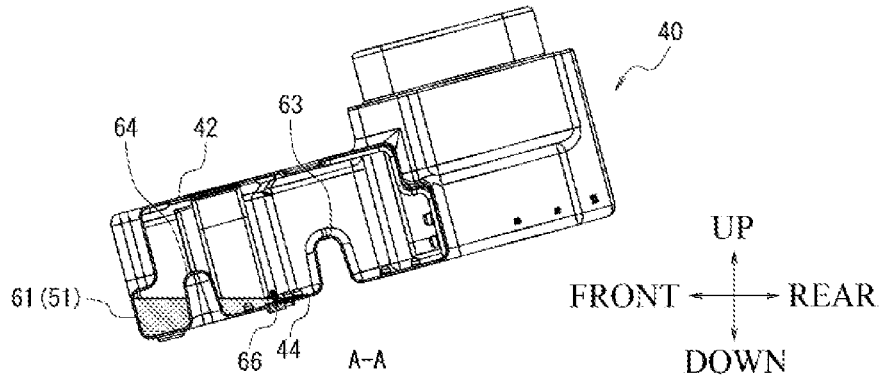
FIGS. 6A, 6B, 6C, and 6D are sectional views illustrating usage states of the fuel tank illustrated in FIG. 3.
Figure 6B:
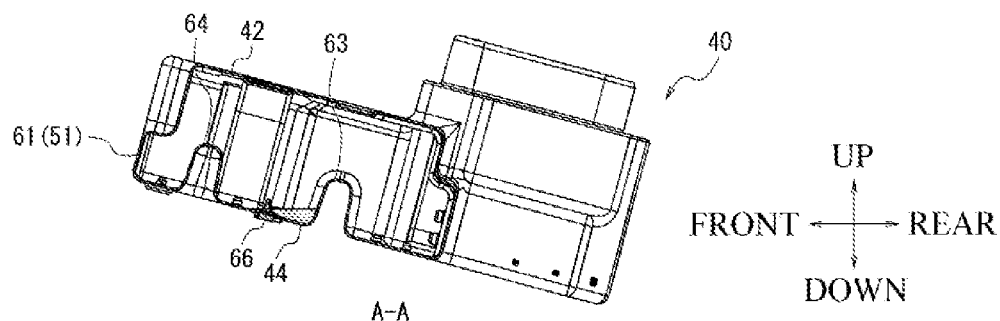
Figure 6C:
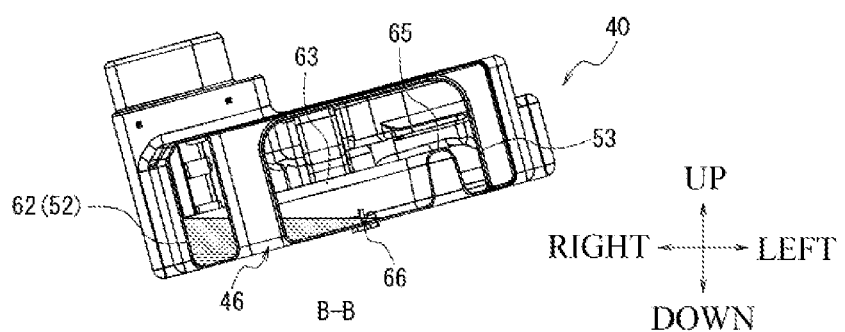
Figure 6D:
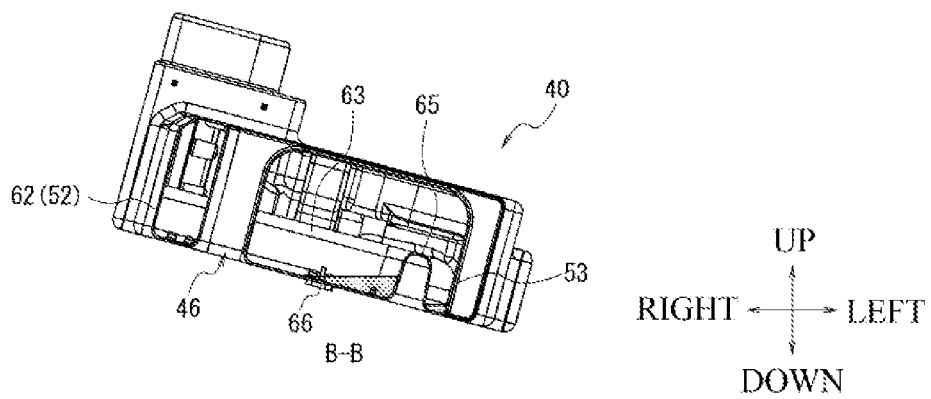

Here, FIGS. 6A, 6B, 6C, and 6D illustrate states that a fuel has stayed in the inner region of the weir portion 60 when the vehicle body 10 is inclined. FIG. 6A is a sectional view illustrating a state obtained when the vehicle body 10 is inclined toward the front (a sectional view taken along line A-A in FIG. 3), and FIG. 6B is a sectional view illustrating a state obtained when the vehicle body 10 is inclined toward the rear (a sectional view taken along line A-A in FIG. 3). FIG. 6C is a sectional view illustrating a state obtained when the vehicle body 10 is inclined toward the right (a sectional view taken along line B-B in FIG. 3), and FIG. 6D is a sectional view illustrating a state obtained when the vehicle body 10 is inclined toward the left (a sectional view taken along line B-B in FIG. 3). As illustrated in figures for such typical four directions (front, rear, right, and left), in whatever direction the vehicle body 10 is inclined, an action that a fuel is caused to stay in the inner region of the weir portion 60 including the position of the fuel suction portion 66 is obtained.

As described above, it is possible to concurrently implement a configuration capable of further increasing an amount of reservable fuel (i.e., the maximum reservation amount in the fuel tank 40) and a configuration that the supply of the fuel is prevented from being stopped due to air entrainment in whatever direction the vehicle body 10 is inclined when a remaining fuel is small. Furthermore, as compared with a conventional configuration (the case where the outside dimension is the same), a verification result that the amount of fuel staying inside the weir portion 60 in the same inclination angle increases has been obtained, so that an advantageous effect leading to prolongation of the operating time of the working vehicle 1 is synergistically obtained.

Here, with regard to a more specific shape of the weir portion 60, the third weir 63, the fourth weir 64, and the fifth weir 65, excluding the first weir 61 also used as the first wall 51 and the second weir 62 also used as the second wall 52, are formed continuous in the shape of letter J in plan view (or, in some cases, the shape of left-right reversal of letter J in plan view depending on, for example, a positional relationship between the second wall 52 and the third wall 53) in which the start end (the right end of the third weir 63) is perpendicular to and continuous with the second wall 52, and in the shape of up-down reversal of letter U in the cross-section thereof (that is, a hollow shape which is convex upward). Furthermore, while the dimensions of the third weir 63, the fourth weir 64, and the fifth weir 65 are not specifically limited, as an example of formation, the width dimension of each of the third weir 63, the fourth weir 64, and the fifth weir 65 is about 50 mm, the length dimension (dimension in the longitudinal direction) of the third weir 63 is about 500 mm, the length dimension (dimension in the longitudinal direction) of the fourth weir 64 is about 300 mm, and the separation dimension between the third weir 63 and the fourth weir 64 is 200 mm. On the other hand, the height dimension of each of the third weir 63, the fourth weir 64, and the fifth weir 65 is about 100 mm.

According to this configuration, the weir portion 60 enables obtaining not only an action of causing a fuel to stay at the time of inclination of the vehicle body 10 but also a reinforcement action of preventing the deformation of the fuel tank 40 (particularly, the bottom surface portion 44). Accordingly, since it is possible to reduce the number of portions subjected to drawing (raised portions provided in an inward protruding manner), a large number of which have been provided for deformation prevention in a conventional fuel tank, it is possible to increase the amount of reservable fuel (i.e., the maximum reservation amount in the fuel tank 40) without increasing the external form of the fuel tank 40.

Moreover, the fuel tank 40 according to the present embodiment is configured to be fixed to the vehicle body 10 with use of two fixing bands 36 and 38 each made from a metallic material. Here, the fuel tank 40 is provided with a fixing band insertion hole 46, into which one end of the fixing band 36 which is one of the two fixing bands 36 and 38, is inserted. The fixing band insertion hole 46 is formed at a region between the second wall 52 and a fore-end portion 64a of the fourth weir 64 in plan view and penetrating through the upper surface portion 42 and the bottom surface portion 44 in such a way as to communicate with an exterior (an outer region of the fuel tank 40) and not to communicate with an interior (an inner region of the fuel tank 40).

Here, an issue that a region corresponding to the opening position thereof (i.e., a region between the second wall 52 and the fore-end portion 64a of the fourth weir 64 in plan view) is a region in which no constituent element of the weir portion 60 is arranged with regard to the third weir 63, the fourth weir 64, and the fifth weir 65 continuous in the shape of letter J (or the shape of reversal of letter J), and is, therefore, relatively low in strength and easily deformable, arises. To address this issue, a configuration that the above-mentioned fixing band insertion hole 46 is arranged at this region is employed, so that the third weir 63, the fourth weir 64, the fifth weir 65, and the fixing band insertion hole 46 are able to be used to prevent portions reduced in strength from being unevenly distributed in the bottom surface portion 44 and, thus, it is possible to obtain a stronger reinforcing effect (deformation preventing effect).

Moreover, the fuel tank 40 is provided with, between the fixing band insertion hole 46 (specifically, a wall surface exposed on the inner side of the fuel tank 40) and the fore-end portion 64a of the fourth weir 64, a flow path 48 opened toward the drain portion 68 and causing the fuel staying inside the weir portion 60 when the vehicle body 10 is inclined to flow toward the drain portion 68 when the vehicle body 10 has become uninclined.

Since, as mentioned above, with regard to the configuration of the weir portion 60, particularly, the third weir 63, the fourth weir 64, and the fifth weir 65 are formed in the shape of letter J (the shape of reversal of letter J), an action of causing a fuel to stay in an inner region of the weir portion 60 at the time of inclination of the vehicle body 10. However, on the other hand, an issue that grounds become likely to stay in the surrounded inner region arises. To address this issue, the above-described configuration enables discharging grounds in the inner region toward the drain portion 68 by causing a fuel staying in the weir portion 60 at the time of inclination of the vehicle body 10 to flow through the flow path 48 when the vehicle body 10 has become uninclined (after that, opening the drain portion 68 enables discharging the grounds to the outside of the fuel tank 40).

As described above, according to a fuel tank of the present invention, it is possible to, while achieving a reduction in the arrangement region (volume region) of a weir portion, cause a fuel in a predetermined amount to stay inside the weir portion in whatever direction out of all directions (360°) the vehicle body is inclined. Accordingly, it is possible to concurrently implement a configuration capable of increasing the volume of a fuel reservation space (i.e., the maximum reservation amount of fuel) and a configuration that the supply of the fuel is prevented from being stopped due to air entrainment in whatever direction the vehicle body is inclined when a remaining fuel is small. In addition to this, it is possible to increase the rigidity of the fuel tank while achieving a reduction in portions subjected to drawing provided at the bottom surface portion.

Furthermore, the present invention is not limited to the above-described embodiment, but can be modified in various manners within a range not departing from the present invention. Particularly, while a track loader has been described as an example of a working vehicle, the present invention is not limited to this, but, naturally, can also be applied to other types of working vehicles such as a skid-steer loader, a tracked dumper, and an excavator.

What is claimed is:

1. A fuel tank, which is mounted at a vehicle body of a working vehicle and in an inner portion of which a fuel is reserved, the fuel tank of the working vehicle comprising:
   an upper surface portion, a bottom surface portion, and a peripheral wall portion;
   a weir portion vertically arranged at the bottom surface portion and causing the fuel in a predetermined amount to stay in a predetermined position of the inner portion when the vehicle body is inclined,
   wherein the peripheral wall portion includes a first wall and a second wall which is perpendicular to and continuous with one end side of the first wall, and
   wherein the weir portion includes a first weir as which the first wall is also used, a second weir as which the second wall is also used, a third weir parallel to the first weir and relatively long, a fourth weir parallel to the first weir, arranged between the first weir and the third weir, and relatively short, and a fifth weir interconnecting the third weir and the fourth weir; and
   a fixing band insertion hole formed at a region between the second wall and a fore-end portion of the fourth weir and penetrating through the upper surface portion and the bottom surface portion in such a way as to communicate with an exterior of the fuel tank and not to communicate with an interior of the fuel tank.

2. The fuel tank of the working vehicle according to claim 1, wherein the third weir, the fourth weir, and the fifth weir included in the weir portion are formed continuous in a shape of letter J in plan view or a shape of left-right reversal of letter J in plan view.

3. The fuel tank of the working vehicle according to claim 1,
   wherein the bottom surface portion includes a fuel suction portion at an inner region surrounded by the third weir, the fourth weir, and the fifth weir and includes a drain portion at an outer region other than the inner region, and
   wherein a flow path opened toward the drain portion and causing the fuel staying inside the weir portion when the vehicle body is inclined to flow toward the drain portion when the vehicle body has become uninclined is provided between the fixing band insertion hole and the fore-end portion of the fourth weir.

4. The fuel tank of the working vehicle according to claim 2,
   wherein the bottom surface portion includes a fuel suction portion at an inner region surrounded by the third weir, the fourth weir, and the fifth weir and includes a drain portion at an outer region other than the inner region, and
   wherein a flow path opened toward the drain portion and causing the fuel staying inside the weir portion when the vehicle body is inclined to flow toward the drain portion when the vehicle body has become uninclined is provided between the fixing band insertion hole and the fore-end portion of the fourth weir.

* * * * *